June 4, 1963 R. W. FISCHMAN ETAL 3,091,868
EDUCATIONAL DEVICE
Filed Nov. 15, 1961 4 Sheets-Sheet 1

FIG. 1

INVENTORS R. W. FISCHMAN
J. OPPERMAN
BY Howard R. Popper
ATTORNEY

June 4, 1963 R. W. FISCHMAN ETAL 3,091,868
EDUCATIONAL DEVICE
Filed Nov. 15, 1961 4 Sheets-Sheet 2

INVENTORS R. W. FISCHMAN
J. OPPERMAN
BY
Howard R Popper
ATTORNEY

June 4, 1963  R. W. FISCHMAN ETAL  3,091,868
EDUCATIONAL DEVICE
Filed Nov. 15, 1961  4 Sheets-Sheet 3

INVENTORS R. W. FISCHMAN
J. OPPERMAN
BY
Howard R Popper
ATTORNEY 3,091,868
EDUCATIONAL DEVICE
Robert W. Fischman, New York, and Joseph Opperman, Great Neck, N.Y., assignors to Educational Institute for Learning and Research, New York, N.Y., a membership corporation of New York
Filed Nov. 15, 1961, Ser. No. 152,684
5 Claims. (Cl. 35—21)

This invention relates to educational devices and more particularly to methods and apparatus for facilitating the teaching of history.

It is well known that many individuals, particularly children, have great difficulty in mastering the subject of history. This is in great part attributable to the fact that these persons cannot mentally picture historical sequences. For example, although one may be able to remember that at one time in French history the Jacobins were a major political force and also that subsequent to the Revolution Napoleon gained power, one might find it difficult to retain not only the respective dates or periods of the various events, but equally as important, their cause and effect relationship or the historical significance of one upon the other. Without the proper perspective history does not appear to have a continuously unfolding nature. Not only is it exceedingly difficult for these persons to remember the nature and importance of isolated events, but what is perhaps most unfortunate is that these individuals never can obtain a true picture of history as they are unable to visualize the various events they are studying in historical perspective.

It is an object of this invention to provide improved methods and apparatus for the teaching of history.

It is another object of this invention to provide methods and apparatus whereby the student may conveniently, rapidly and efficaciously learn the dates and periods of events he is studying.

It is still another object of this invention to provide methods and apparatus whereby a clear and more complete appreciation of the continuity and interrelationship of historical events may be obtained more rapidly and conveniently than has heretofore been possible.

The invention is predicated upon the fact that a fuller grasp of the historical significance of various events may be obtained if these events are displayed not only pictorially and sequentially, as in book form, but on a continuous and calibrated paper or other suitable tape. In accordance with one aspect of the invention, a continuous reel of paper tape of approximately two inches diameter is provided. This reel of tape may be placed on one spindle of a tape transport mechanism with another reel provided for the take-up. The apparatus is similar to an ordinary tape recorder although paper tape of much larger width is used rather than the conventional magnetic tape. Most essential is the fact that the paper tape is calibrated. For example, one inch on the tape may represent one year of history. On the tape are printed in a calibrated and sequential manner every fifth or other multiple of a year. Thus if a particular tape is to be used for the teaching of history from the year 1000 B.C. until the present, the front end of the tape will have the date 1000 B.C. printed along the top edge. Five inches away from the front of the tape and also along the top edge is printed the year 995 B.C.; five inches away the year 990 B.C., etc. until the last date at the end of the tape appears, for example 1965 A.D.

The student, in studying, and in accordance with one use of the invention, pastes stamp-like pictures on the tape underneath the appropriate years. Alternatively, the tape may have the pictures displaying the historical events already printed on it when manufactured. In either event a continuous picture of history is rendered available so that the student is no longer required to mentally visualize historical sequences nor is he required to turn the pages of a book whereby the mental picture can be unfortunately disrupted. The tape is wound by the student with the various events of significance continuously unfolding before his eyes. What is, perhaps, even more significant is the fact that a historical perspective is achieved without requiring the memorization of dates. As the tape unfolds in a continuous manner the student soon subconsciously and effortlessly knows that the Jacobins seized power before and helped lay the foundation for the rise of Napoleon. Not only are the events sequenced properly but the fact that Napoleon's reign occurred so soon after the Jacobins', as seen by the Napoleon vignette occurring soon after the Jacobins', aids the student in understanding that the one directly or at least partially led to the other. The historical interrelationships of important events, achievements, periods, etc. become inexorably fixed in the student's mind. The continuous picture tape actually shows one event following the other with no confusing disruptions, and because the tape is linearly calibrated the historical events are automatically placed in their proper historical perspectives by the student.

By using "time" as a frame of reference for the fixing of historic events, a gestalt or wholeness is provided for many learners which more traditional methods, such as readings, lectures, film strips and motion pictures, separately or in combination, may not effectively communicate. A unit of perception achieved by study in isolation is difficult to fix in awareness and to retain. The invention facilitates equipping such learners with an apperceptive-mass to which further concepts may more readily be linked.

Many learners have particular difficulty in the rapid shifting of the mental products of time-sequences. The very abstraction of time-function, the before-and-after relative to a particular datum of learning experience, is frequently an insurmountable stumbling block to the study of history for such learners. A day, a month, a year, a decade are abstracts devoid of meaning unless concretely associated with a perceptual and motor task. The invention makes possible the concretization of the event within a known and readily-perceived frame of reference facilitating the apprehension of further percepts and concepts.

As a further example of the advantages of the invention consider the effect on the student when he observes those portions of the tape representing the time intervals from 400 A.D. till 1000 A.D. and from 1750 A.D. till the present passing before him. The former is the period of the Dark Ages. Very little can be entered on this relatively extensive portion of tape. The fact becomes firmly implanted in the student's memory that there was very little for him to enter on the tape in that portion represened by the Dark Ages precisely because few religious, scientific, political and economic events of surviving significance occurred. On the other hand consider how acutely he becomes aware that the great technology of our day blossomed only in the last 200 years as represented on a relatively short length of tape. The pictorial representations of these two periods of history in a continuous, sequential and calibrated manner emphasize their significances and durations as has been heretofore impractical.

The first and basic embodiment of the invention provides a tape transport mechanism having stop, forward and reverse controls. Two reels are provided and the calibrated paper tape is wound thereon. In accordance with an aspect of this embodiment of the invention, means are provided for automatically mechanically pasting vignettes on the tape. In addition, two cover-up panels are provided. One of these can be moved to cover the printed dates on the tape while the other may be moved to cover the major part of the tape, the area of pictorial representation. In this manner the student may cause the tape to be wound to any point he desires and have showing either only the date or only the vignettes. The blanking of the tape in this manner stimulates the student operating the apparatus to then supply the other for self-testing purposes.

In accordance with a second embodiment of the invention four tapes are provided, all wound on the same two reel-supporting shafts and appearing in parallel on the viewing area of the tape transport enclosure. The top tape is slightly greater in width than the other three, the dates being printed on this tape alone. The four tapes are used respectively for representing thereon events of political, economic, religious and scientific significance. The various pictorial representations are pasted on the different tapes in order that it become clear to the student that these four aspects of history are very much interrelated. Not only is each aspect given its own historical perspective but the relationship of one to the other is apparent. It becomes clear almost subconsciously, for example, that the same factors contributed to motivation of a religious Reformation, a scientific Renaissance, economic development and growth, and political agitation. This method of utilizing parallel tapes is highly efficacious.

In accordance with a third embodiment of the invention means are provided for recording the student's voice. At the same time that the student pastes a picture depicting a historical event on the paper tape he records in his own voice and words the nature of the event he is studying. In this manner, at any future time he may observe the pictorial representation of any event at the same moment that he is listening to his own description of it. It is apparent that various events require different lengths of recording tape to be associated therewith. For this reason means are provided to allow the student to synchronize the recording tape with the paper tape and yet allow him any length of recording tape he desires for each event.

It is a feature of this invention to provide tape transport means for automatically or manually transporting a calibrated dated paper tape.

It is another feature of this invention in one embodiment thereof to provide means for automatically pasting premanufactured drawings or vignettes on the tape.

It is another feature of this invention in one embodiment thereof to provide cover-up panels for covering either the pictorial representations or the dates on the paper tape.

It is another feature of this invention in one embodiment thereof to provide four parallel tapes all wound on the same two shafts, the four tapes representing respectively events of political, economic, religious and scientific significance.

It is another feature of the invention in one embodiment thereof to provide means for enabling the student to apportion any desired length of magnetic or similar voice recording tape to any of the events depicted on the paper tape, these means including means for automatically synchronizing the paper and recording tapes to each other.

Further objects, features and advantages of the invention will become apparent upon consideration of the following description, taken in conjunction with the drawing, wherein.

Figure 1:
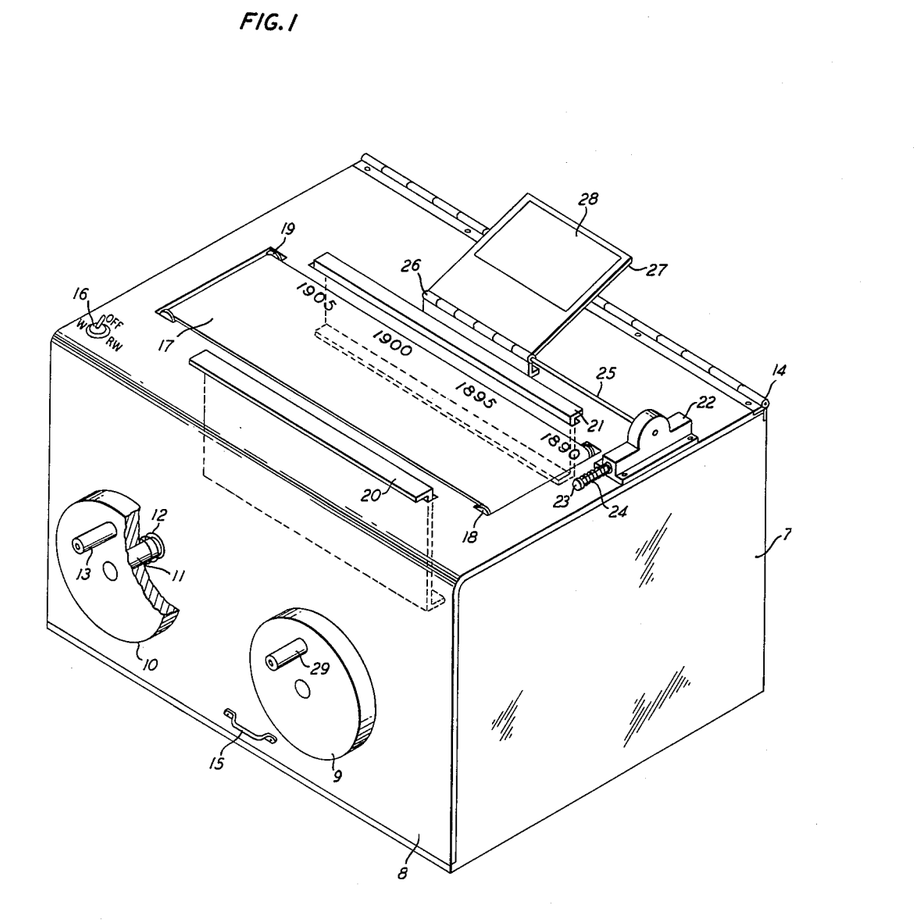
FIG. 1 is a perspective view of a first embodiment of the invention.

A perspective view of the first embodiment is shown in FIG. 1. Referring to this figure a continuous movable tape 17 is wound on two reels contained within the enclosure 7. The tape itself passes over rollers 18 and 19 attached to the lid 8. The lid 8 comprises the front and top of the device and is connected by a hinge 14 to the enclosure 7. A handle 15 is attached to lid 8, this handle being used for rotating the lid 8 about hinge 14 for lifting it in order to initially wind the tape 17 on the two reels contained within the enclosure.

Toggle switch 16 projects through lid 8. This switch controls the operation of two motors contained within enclosure 7. When the switch is placed in the W or wind position one motor operates and causes one of the reels to rotate. When the switch is in the RW or rewind position the other motor causes the other reel to rotate. In this manner the paper tape 17 may be automatically wound in either direction.

The wheels 9 and 10 having thereon respective handles 29 and 13 are used for manually rotating either reel. A shaft is attached to each of these wheels and connects the respective wheel through a clutch arrangement, not shown in FIG. 1, to a respective reel. The wheel 10 is shown in cut-away form to disclose the shaft 11 and spring 12. Each wheel and shaft arrangement is provided with a spring for normally disengaging the respective shaft from the associated reel. In this manner when the tape is driven by one of the two motors the wheels 9 and 10 do not rotate and thus cannot possibly injure the hand of the student. The motor driving mechanism is provided for winding and rewinding the tape at a convenient speed. The manual controls are provided for moving the tape through shorter distances.

On the tape 17 are printed in a chronological and calibrated manner a series of dates, the dates 1890, 1895, 1900, 1905 and a part of 1910 being shown on the drawing. The student pastes the premanufactured stamp-like picture or draws a pictorial representation of a historical event under the appropriate date. Thus, for example, under the year 1900 a picture of Theodore Roosevelt, elected the 25th President of the United States, would be placed. Similar pictorial representations are attached to or drawn on the tape under the appropriate portion of the tape within each five year interval.

The student by use of the manual controls 13 and 29 or the motor driven mechanism controlled by toggle switch 16 causes the reels to wind or rewind until the desired section of the tape appears before him. This procedure is followed whether the student is constructing the pictorial representations on the tape, or whether he is studying from a tape he has previously worked upon, or from a manufactured tape already containing thereon the pictorial representations. It is apparent that the various events of history continuously unfold before the student's eyes. Not only are these events depicted in pictorial representations under the appropriate dates but in addition the events are given their true historical perspectives. The proximity of one event to another, that is, the physical distance between one pictorial representation and another depends upon their time relationship. This relationship is inexorably fixed in the student's mind by the use of the calibrated dated tape. In this manner he gains a true historical perspective and becomes aware of the continuous nature of the subject he is studying.

Two cover-up panels 20 and 21 are provided. These panels are in the most part hidden by the lid 8 and enclosure 7. When it is desired to cover up either the dates or the pictorial representations either panel is lifted and folded over the appropriate portion of the tape. This is achieved in an obvious manner. The purpose of these two panels is to enable the student to visualize either the dates or the pictorial representations alone. As a test of his knowledge he may then mentally supply the hidden information.

Means are also provided for conveniently pasting the pictorial representations on the tape. When the push rod 23 is operated a rack and gear arrangement within the housing 22 causes shaft 25 to rotate in such a manner that the slab 27 attached to the shaft rotates about hinge 26. The gummed surface of the stamp-like pictorial representation is placed upwards on the section 28 of slab 27. When the push rod is operated the slab 27 rotates and is placed directly on the tape 17. Area 28 is chosen so that when the slab 27 is rotated to a position on top of the tape, area 28 is directly above that area of the tape 17 provided for the pictorial representation. In this manner the pictorial representation may be conveniently and advantageously attached to the tape 17. The push rod 23 is spring loaded. Spring 24 is provided so that once the push rod is operated it is automatically released and slab 27 reverts to its normal position as shown in the figure. The pictorial representation is held on slab 27 by placing on area 28 a material which causes the pictorial representation to adhere to it by means such as electrostatic attraction. When the slab is pressed upon the tape, the latter is supported by lid 8 over which the tape passes. The stamp-like pictorial representation includes on its underside an adhesive which causes it to adhere to the tape when it is applied.

Figure 2:
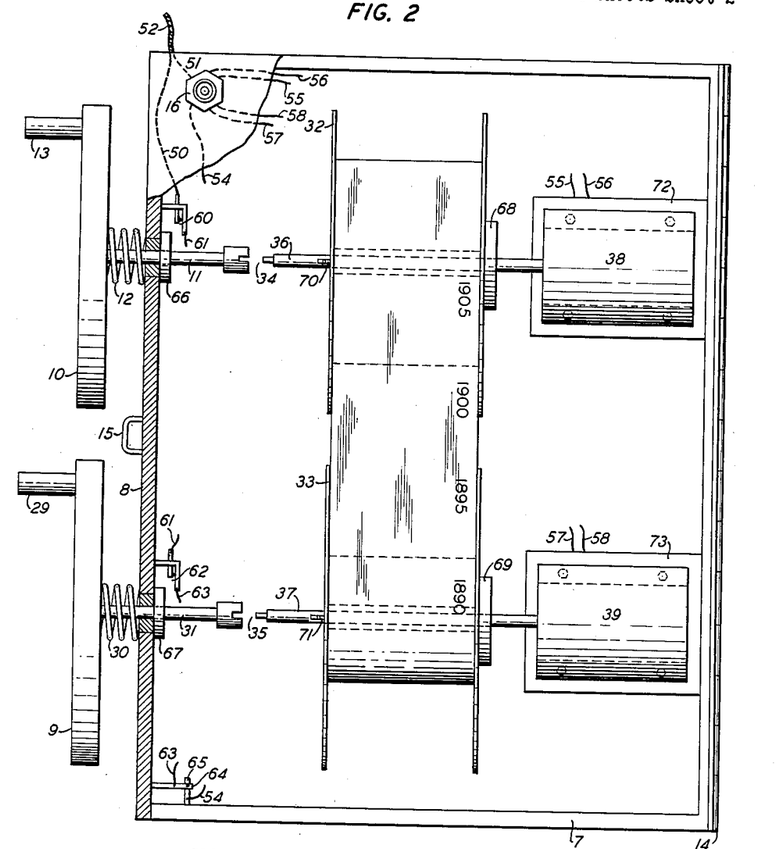
FIG. 2 is a cut-away top view of the embodiment of FIG. 1.

FIG. 2 is a top view of the embodiment of FIG. 1. A portion of the top part of lid 8 has been cut away in order to show what is beneath it. The two shafts 11 and 31 are shown connected to the respective shafts 36 and 37 having thereon reels 32 and 33 by two respective clutch assemblies 34 and 35. When the handle 13 is grasped and the wheel 10 pressed against the lid 8 it is seen that clutch 34 is engaged. By then turning the wheel 10 shafts 11 and 36 rotate. Shaft 36 when rotated causes reel 32 connected thereto to rewind the tape. In a similar manner wheel 9 is operated and winds the tape on reel 33. The springs 12 and 30 are provided for normally disengaging the clutch assemblies. In the normal positions the clutch assemblies are as shown with the shafts 11 and 31, respectively, disengaged from shafts 36 and 37. In this manner when the reels are rotated by the operation of one of motors 38 and 39 the wheels 9 and 10 do not move and there is no danger of injuring the student's hand if he is grasping one of the handles.

There are six terminals on toggle switch 16. Conductors 50 and 51 are connected to the wall socket or other power source by the cord 52. There is a closed path connecting conductor 50 to conductor 54, this path to be described hereinbelow. Conductors 51 and 54 are connected respectively to either conductors 55 and 56 or conductors 57 and 58 by the operation of the toggle switch. In the neutral position conductors 51 and 54 are connected to none of conductors 55—58 and neither motor is operated. In the wind position conductors 51 and 54 are connected respectively to conductors 57 and 58 and motor 39 operates. This motor turns shaft 37 which in turn causes reel 33 to rotate and the tape to be wound on it. Similarly when the switch is in the rewind position conductors 51 and 54 are connected to conductors 55 and 56 respectively and motor 38 operates. This motor rotates shaft 36 and reel 32 and the tape is rewound on this reel.

Conductors 50 and 54 are provided as part of a safety mechanism. Rather than connecting conductors 50 and 51 directly to either conductors 55 and 56 or conductors 57 and 58 the series circuit connecting either motor to the power source includes conductor 54. Conductor 50 is connected through contacts 60 to conductor 61. Conductor 51 is connected through contacts 62 to conductor 63. Conductor 63 terminates in the metallic protrusion 64 which is connected to the bottom of lid 8. The protrusion 64 contacts the metallic protrusion 65 which is connected to the inside lower section of enclosure 7. Both protrusions 64 and 65 are insulated from the lid 8 and enclosure 7 respectively, as are also contacts 60 and 62. Conductor 54 is connected to the metallic protrusion 65.

When either set of contacts 60 or 62 is opened the series circuit connecting the power source to either motor is opened. Similarly if the lid 8 is lifted and the two metallic protrusions 64 and 65 do not contact each other the series circuit is opened and neither motor operates. These three contact devices are provided as safety features. When the student is manually turning reel 32 by pressing wheel 10 against lid 8 and engaging the clutch assembly 34 it is seen that the flange 66 opens contacts 60. Similarly when he is manually operating wheel 9 and reel 33, flange 67 causes contacts 62 to open. In this manner the motor cannot be operated while the student is manually operating the machine. This safety feature is provided to insure that the wheels 10 and 9 may not be caused to rotate by the operation of either motor. The motors are only energized when the two clutch assemblies are disengaged.

In a similar manner the cover safety switch comprising protrusions 64 and 65 prevents the operation of either motor when the lid is in a lifted position. The lifting of the lid causes the two elements 64 and 65 to be separated and the series circuit broken. The motors only operate when both clutch assemblies are disengaged and the lid 8 is securely placed on the enclosure 7.

Figure 2A:
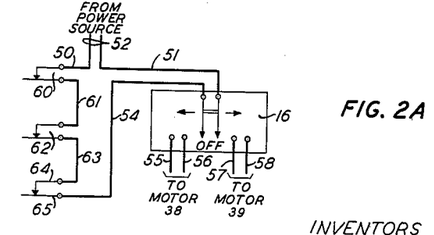
FIG. 2A is a more detailed schematic of a switch included in the cut-away view of FIG. 2.

FIG. 2A discloses the electrical connection in greater detail. Conductor 51 is connected directly to one of the ganged movable contacts within toggle switch 16. Conductor 50 is connected through the three sets of contacts to conductor 54 which is connected to the other of the movable contacts within the switch. When the toggle switch is operated conductors 51 and 54 are connected to either conductors 58 and 57 or conductors 56 and 55. One of the two motors is thus operated if all three sets of safety contacts are closed.

The reels 32 and 33 are held in place on shafts 36 and 37 by the two positioning flanges 68 and 69 and the two spring loaded positioning devices 70 and 71. The flanges are fixed to the respective shafts 36 and 37. The spring loaded positioning devices 70 and 71 are of the type wherein a metallic disk shaped surface extends from the shafts 36 and 37. In their normal positions these devices are partially above the shafts and together with the positioning flanges hold the reels in place. When it is desired to place a reel in the machine or to remove one it is merely necessary to exert a slight force against the spring loaded positioning device 70 or 71 and to depress it within the shaft. When depressed, the reels slide over them.

The shafts 36 and 37 on which the reels are placed are connected to the respective motors 38 and 39. The motors are rigidly fixed by means of bolts connecting them to the respective mounting brackets 72 and 73. Shafts 36 and 37 are removable from respective motors 38 and 39 in order that the tape wheels may be mounted on them. Shafts 36 and 37 are insertable into the respective motors in such a manner that the motors exert no force on them other than the circumferential torques.

Figure 3:
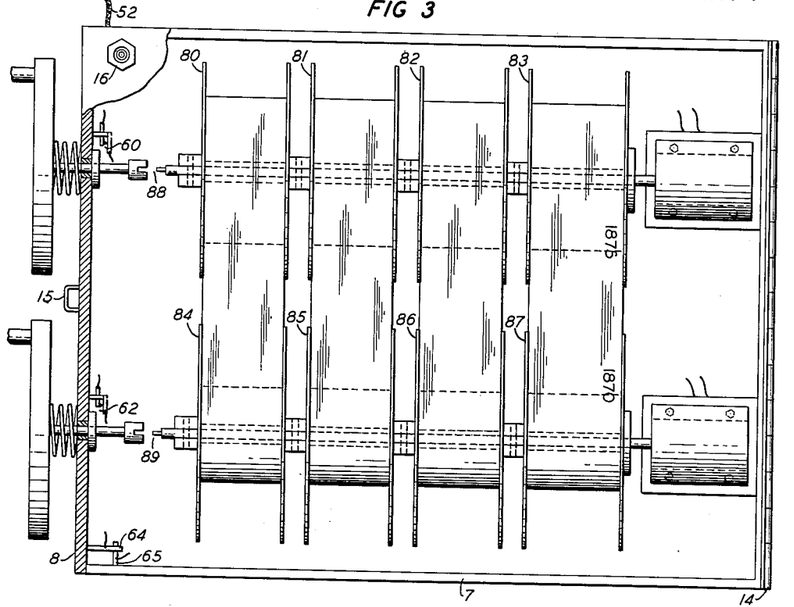
FIG. 3 is a cut-away top view of a second embodiment of the invention.
Figure 4:
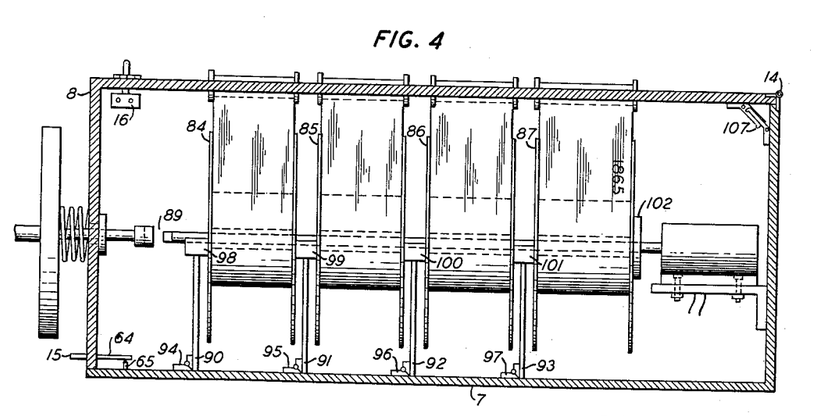
FIG. 4 is a cut-away side view of the second embodiment of the invention.

FIG. 3 is a top partial view of a second embodiment of the invention and FIG. 4 is a partial side view of the same embodiment. In this second embodiment four reels 80—83 and 84—87 are positioned on each of respective shafts 88 and 89. Each shaft is again turned by either manual or motor driven equipment. Only parts of these various controls are shown; their similarity to the controls of FIGS. 1, 2 and 2A obviate the necessity of repeating their disclosures.

The four reels are maintained in their respective positions on each shaft by slightly different positioning mechanisms. A series of spring loaded positioning devices such as 70 and 71 in FIG. 2 would be insufficient in the embodiment of FIGS. 3 and 4. The shafts are much longer in this embodiment as they each carry four reels. Consequently some additional means must be provided for supporting the shafts 88 and 89. Referring to FIG. 4 the means associated with shaft 89 are disclosed, the identical mechanisms associated with shaft 88 being hidden behind those associated with shaft 89 in the drawing. Each of the four members 90—93 is connected to a respective nylon or similar block 98—101. These blocks not only separate the reels from each other but in addition support the shaft 89. Nylon or similar material having an adequate bearing surface is used. The reels as well as the shafts bear against the various surfaces of the blocks 98—101 and consequently they should be of good bearing material.

The positioning flange 102 is permanently attached to the shaft 89. In order to place the first reel 87 on the initially unloaded shaft 89 the four members 90—93 are bent on their respective hinges 94—97 in order that the reel 87 slide along the shaft until it is up against the positioning flange 102. Member 93 is then released and springs up. The nylon block 101 not only positions reel 87 firmly but in addition provides a bearing surface for the shaft 89. Reel 86 is then placed on the shaft and member 92 released. This member separates reels 86 and 85. In a similar manner reels 85 and 84 are placed on the shaft 89. Shaft 89 is removable from its respective motor as is shaft 88 in the same manner as shafts 36 and 37.

The reels are placed on the shafts when the lid 8 is in uplifted position. Again the motors in the embodiment of FIGS. 3 and 4 are prevented from operating when the lid is up and the cover safety switch 64 and 65 open. Hinge 107 is provided in addition to the hinge 14 of the first embodiment. The cabinet hinge 107 is of the type which maintains the lid in a lifted position once it is placed there. When it is desired to close the lid the hinge is depressed in a well-known manner and the lid closes once again.

The reels 83 and 87 are slightly wider than the reels 80—82 and 84—86. The dates are printed on one tape alone. The four tapes are used respectively for representing thereon events of political, economic, religious and scientific significance. As has been described heretofore the various pictorial representations are attached to different tapes in this embodiment in order that it becomes clear to the student that these four aspects of history are not only very much interrelated but in addition in order that each be given its own historical perspective as well.

Figure 5:
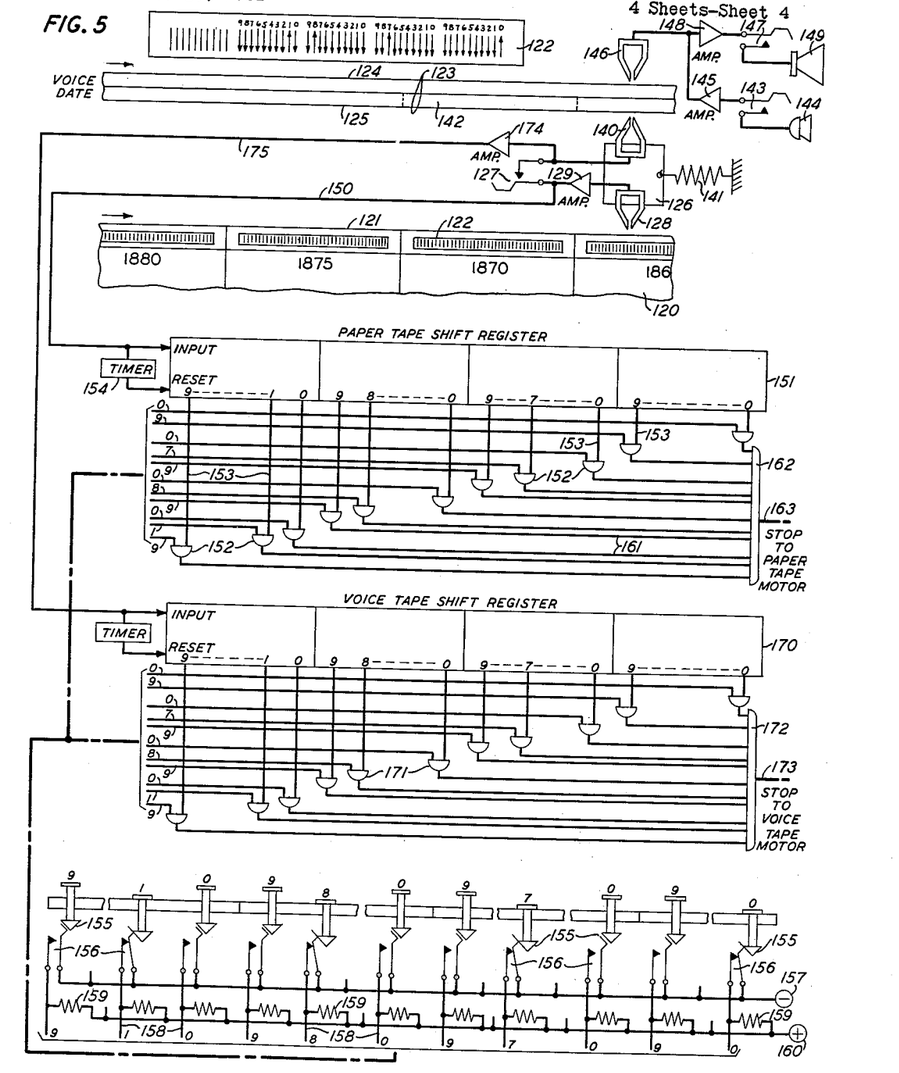
FIG. 5 shows additional features comprising a third embodiment of the invention.

The third embodiment of FIG. 5 is similar to the first embodiment of FIGS. 1, 2 and 2A. For this reason almost all of the detail of the first embodiment is omitted in this figure. Only the additional structure is disclosed.

The embodiment of FIG. 5 provides means for recording the student's voice on a magnetic tape. This is not only of aid in the teaching process but in addition enables the student to test himself. The tapes are eraseable and the student records verbal descriptions of the pictorial representations he is visualizing. At a later time he compares his own verbalization with a prior script provided by the manufacturer along with the stamp-like pictorial representations.

It is essential to synchronize the magnetic and paper tapes. This is necessary in order that the student be able to automatically have the appropriate portion of magnetic tape playing while he is visualizing a particular vignette on the paper tape. It is not possible to provide the same length of magnetic tape for each equal length of paper tape for it is apparent that certain historical events require a greater amount of elucidation than do others. Means are provided therefore for enabling the student to apportion any length of magnetic tape to a particular year or period of history. By operating a series of keys he can control the paper tape to be automatically wound on the reels. Only the period he desires is on the exposed portion of the paper tape. Not only is the paper tape automatically transported but in addition the magnetic tape is automatically moved as well. When the student operates keys designating a particular date the magnetic tape is automatically wound until that portion of the tape bearing the verbal description of the year or period selected is adjacent to the voice reproducing or recording mechanism. At this time the student can either record his voice or listen to it being played back.

The circuits employed for achieving this feature consist primarily of two shift registers and a plurality of AND gates. Shift registers are well known in the electronic art. The shift registers employed each contain 40 stages. Each stage can be maintained in either an energized or an unenergized condition. Each input pulse places the first stage in either an energized or unenergized state. The succeeding pulse sets the first stage in accordance with the information it carries and causes the information stored in the first stage by the previous pulse to be shifted to the second stage. The second stage is thus energized or unenergized in accordance with the first pulse while the first stage is energized or unenergized in accordance with the second pulse. In a similar manner the third pulse controls the state of the first stage and shifts the states of the first and second stages to the second and third stages respectively. After the 40th pulse is received the 40 stages of each shift register are set in accordance with the 40 respective input pulses.

The pulses in the invention are of either a positive or negative polarity. A negative pulse energizes the first stage of the shift register while a positive pulse does not. These positive and negative pulses are recorded on a magnetic tape in a manner to be described hereinbelow.

The AND gates used in the invention are of the type having two input terminals and one output terminal. The output terminal is energized if the inputs to both input terminals have the same polarity, that is, they are both either positive or negative. In such an event the output terminal is energized.

In the embodiment of FIG. 5 the paper tape 120 has attached to it a magnetic tape 121. On the magnetic tape, alongside each section of paper tape, is magnetically recorded the date written on the tape. The section of magnetic tape 122 above the section of paper tape containing the date 1870 is shown in an enlarged view at the top of the figure. It is seen that a series of impulses are recorded on the magnetic tape. The magnetization of each part of the tape is in either a neutral condition, or in an upward or downward direction. Each section of magnetic tape such as section 122 has 50 impulse positions. The left-most 10 positions are neutral, that is, the tape is unmagnetized. Of the second 10 left-most positions only the magnetization of one position is in the upward direction. In each set of ten the right-most position represents a zero, the second right-most a one, etc. As seen in the section of magnetic tape 122 the magnetizations under positions 0 and 2—9 are in a downward direction in the second left-most group. Only the magnetization in the 1 position is in the upward direction.

Of the middle group only the magnetization of position 8 is in the upward direction. Similar remarks apply to the positions 7 and 0 of the two right-most groups.

As seen in FIG. 5 the date 1870 is represented on the section of magnetic tape 122 by having the single upward magnetization in each group of ten in the appropriate position. In a similar manner the section of magnetic adjacent to the section of paper tape bearing the date 1875 has the date 1875 recorded on the magnetic tape. Similar remarks apply to the remainder of the magnetic tape 121.

A second magnetic tape 123 is provided. This tape has two tracks. Track 124 is used for recording the voice of the student. Track 125 is used for placing thereon the date of the event the student is describing. It is necessary to synchronize the voice tape with the paper tape. For this reason the paper tape is provided with the magnetic tape section having prerecorded thereon the dates associated with each section of the paper tape. When the student uses a particular section of track 124 for recording voice information he manually records the appropriate date as contained on track 121 on track 125.

This is accomplished by means of movable block 126 and the associated equipment. Key 127 is operated and it is seen that all electrical impulses induced in the head 128 are transmitted via amplifier 129 and the contacts on key 127 to the head 140. The student operates key 127 and manually pulls the block 126 to the left until he reaches the left end section of the selected date on the magnetic tape 121, the left end of section 122 for example. When he releases the block, spring 141 pulls it back to the position shown. However, in so doing the magnetizations within section 122 cause electrical impulses of the appropriate polarities to be induced in the head 128. These impulses are transmitted through amplifier 129 and key 127 to head 140. As the spring pulls the block to the right the magnetizations of section 122 are recorded on the track 125 of tape 123. The leftmost portion of section 142 of track 125 is unmagnetized as is the left-most portion of section 122. There follows eight positions having magnetizations in the downward direction, followed by one position having a magnetization in the upward direction, etc. The date is recorded on the section 142 exactly as it is recorded on the section 122. Each time the student records a description of another historical event, before he begins he operates key 127 and pulls the block 126. By recording the dates of the events he is describing on track 125 he will be able in a manner to be described hereinbelow to later automatically select a particular portion of the tape 123 and will thereby be enabled to listen to a particular verbal description on the voice track 124.

In order to record the verbal description on track 124 key 143 is operated. The student speaks into microphone 144 and his voice signals are transmitted through amplifier 145 to the head 146. By means of this head the verbal description is recorded on the track 124. When the student desires to listen to his own description he operates key 147. As the tape moves from left to right the head 146 detects the voice record. The signals are transmitted through amplifier 148 and key 147 to speaker 149.

Means are provided in the embodiment of FIG. 5 to enable the student to automatically select a particular section of paper tape and the associated portion of magnetic tape 123. The embodiment of FIG. 5 is provided with motors and manual controls for winding and rewinding the tape as are the first two embodiments. In addition it is provided with two extra motors, these motors also not shown in the drawing as they control the motion of the tape in a similar manner to the motors disclosed in the other figures, for moving the respective tapes in the forward direction or as shown from left to right. These motors are of the type which operate when a starting key is operated and continue to operate until a stop signal is received. Means are provided in the embodiment of FIG. 5 for transmitting stop signals to the two motors when the two respective tapes have advanced to those points where the pictorial representation and verbal description associated with the particular date selected by the student are recorded.

As the picture and magnetic tape combination 120 and 121 moves from left to right the impulses on the magnetic tape 121 induce electrical signals in the head 128. These signals are transmitted via amplifier 129 and conductor 150 to the input of shift register 151. This shift register contains 40 stages divided into four groups of ten stages each. A vertical magnetization induces an electrical signal in the head 128 which energizes the first stage of shift register 151. The next input shifts this energized state to the second stage and in addition either energizes or de-energizes the first stage. A downward magnetization results in an unenergized stage. It is thus seen, for example, that when the section 122 has passed the head 128 in moving from left to right, stage 1 of the left-most group of ten stages of shift register 151 is energized. Similarly stages 8, 7 and 0 of the second, third, and fourth groups respectively are energized. The remaining stages are unenergized. Each stage is connected by an output conductor 153 to one of AND gates 152. If the stage is energized a negative potential is applied. If it is unenergized a positive potential is applied instead. Thus for each date four of the 40 AND gates 152 have negative potentials applied to their inputs connected by conductors 153 to the associated four energized stages of shift register 151. The remaining 36 gates have positive potentials applied to their inputs connected by conductors 153 to the respective 34 unenergized stages. As the tape 121 moves by head 128, successive dates are stored in shift register 151.

The student selects a date by operating four of the 40 keys 155. These keys are arranged in four groups of ten each and the student selects one key in each group. In the drawing the keys 1, 8, 7 and 0 in the four respective groups have been operated. Each key when operated locks the associated contacts 156. When these contacts close, a negative potential source 157 is connected to the associated conductor 158. The conductors 158 are each connected to one input of a respective one of AND gates 152. The conductor 158 associated with key 9 of group 1 is connected to the left-most AND gate 152. The conductor 158 associated with key 8 of group 1 is connected to the second left-most AND gate 152. In a similar manner the other 38 conductors 158 are connected from the 30 keys to the 30 respective AND gates. When a particular key is operated a negative potential is applied to the associated conductor 158 and therefore to one input of the associated AND gate. If a key is not operated it is seen that the associated conductor 158 is connected directly through a resistor 159 to a positive source 160. If a key is not operated a positive potential is applied to the input of the associated AND gate 152.

Thus when the student operates four of the keys 155 the associated four AND gates have applied to one of their two inputs a negative potential. The remaining 36 AND gates connected to conductors 158 associated with unoperated keys have positive potentials applied to the associated inputs. Four of the AND gates 152 have negative potentials applied to their inputs connected to the shift register 151. The remaining 36 inputs connected to shift register 151 are positive in potential. As the tape 121 passes the head 128 successive dates are stored in shift register 151 and therefore successive groups of four of conductors 153 are energized negatively. When the date contained within shift register 151 is the same as the date selected by the student the four conductors 153 having negative potentials thereon are connected to the same AND gates 152 which have connected to their second inputs conductors 158 having thereon negative potentials due to the operation of the associated keys 155. Both inputs of the remaining 36 AND gates similarly are of the same polarity, these 36 pairs of inputs all being positive. It is only at this time that signals are applied to all 40 of the output conductors 161. These 40 output conductors are connected to the 40 inputs of AND gate 162. This AND gate is of the type which applies an output pulse to conductor 163 only when signals are applied to all 40 inputs. Thus AND gate 162 is operated only when the 40 AND gates 152 operate. Conductor 163 is energized only when the date contained in shift register 151 is identical to the date selected by the student. At this time the signal applied to conductor 163 operates the stop control of the motor used for winding paper tape 120 (attached to magnetic tape 121). The motor stops operating and the tape 120 is wound no further. At this point the selected section of paper tape is before the student, in the illustrated case the section shown in FIG. 5.

The timer 154 is connected between the reset terminal of the shift register 151 and conductor 150. This timer is of the type which automatically applies a reset pulse for de-energizing all 40 stages of the shift register 151. After each input pulse of either polarity the timing cycle begins and after a predetermined time the reset pulse is applied. However, if an input pulse of either polarity is applied prior to the completion of the timing cycle the timing cycle begins anew. The timing cycle has a duration equal to the time required for five impulse portions of the tape 121 to pass by the head 128. Thus as the 40 impulses of either polarity representing the date on a section such as section 122 are being applied to the input of shift register 151 the timing cycle never terminates and a reset pulse is not applied. However, when the left-most portion of the section 122 passes by the head 128 no signals are applied to the input of shift register 151. Consequently the timer times out and a reset pulse is applied. The reset pulse de-energizes all 40 stages in the shift register 151 and readies it for reception of a new date or new sequence of 40 pulses.

In the same manner that means are provided for automatically stopping the motor winding the paper tape, means are provided for stopping the motor winding the magnetic tape 123 at that point where the verbal description relating to the selected date is beneath the head 146. The student then operates a motor associated with the tape 123 at the correct speed for reproducing his verbal description. Key 147 is operated and the student hears his voice through speaker 149.

The means for stopping the motor associated with magnetic tape 123 used in the automatic selection procedure are identical to the means for stopping the motor associated with the paper tape. Shift register 170 is provided with 40 stages. Forty AND gates 171 are provided and connected to the 40 stages of shift register 170 and the 40 conductors 158 in a manner identical to the connections of the 40 AND gates 152 to shift register 151 and conductors 158. AND gate 172 is analogous to AND gate 162. As the tape 123 passes the head 140 electrical signals are induced in the head 140 with a polarity depending upon the directions of the magnetizations of the track 125. These signals are transmitted from the head 140 through amplifier 174 and conductor 175 to the input of shift register 170. When the date stored within shift register 170 is identical to the date selected by the student a signal is applied to conductor 173. This signal stops the motor which is moving the tape 123. At this point the student operates the motor for moving the tape at that speed required for proper voice reproduction.

Each of the shift registers 151 and 170 and the associated equipment is independent of the other. Stop signals are applied to conductors 163 and 173 at different times. Whichever one of the paper tape 120 (and attached magnetic tape 121) and tape 123 reaches the desired position first is stopped at this point. The other tape continues until it too reaches that position selected by the student.

It is thus seen that in the embodiment of FIG. 5 the student is enabled to record on a magnetic tape a verbal description of the same event for which he is attaching a pictorial representation to the paper tape. He is likewise enabled to record magnetically the date of the event he is describing directly on the magnetic tape. In this manner he can automatically select the particular portion of either tape associated with a particular period of history he wishes to study. By providing means for enabling him to verbally record a description of the same event he is pictorially reproducing on the paper tape, the learning process is greatly enhanced. Not only does the student perceive history as a continuous process and not only is he given a proper historical perspective, but in addition he becomes even more familiar with the events, personalities and periods he is studying because he can record in his own words verbal descriptions of the pictorial representations he is attaching to the continuous and calibrated paper tape. The features disclosed in the first two embodiments including the four parallel paper tapes may be easily incorporated into the embodiment of FIG. 5 in an obvious manner.

It is to be understood that the above-described arrangements are illustrative of the application of the principles of the invention; numerous other arrangements may be devised by those skilled in the art without departing from the spirit and scope of the invention.

What is claimed is:

1. An educational apparatus for aiding the teaching of history comprising first and second reels, a paper tape having portions thereof calibrated according to and displaying successive dates, said tape being wound on said first and second reels, means for sequentially displaying said portions of said tape for the entry thereon of pictorial historical representations adjacent appropriate ones of said successive dates, and means for automatically attaching said pictorial historical representations to said tape.

2. An educational apparatus for aiding the teaching of history comprisng a linearly dated tape for representing thereon historical vignettes, means for moving said tape to expose any preselected portion thereof, voice recording means, means for recording on said voice recording means, and means for synchonizing said voice recording means and said linearly dated tape.

3. An educational apparatus comprising a paper tape for depicting thereon historical events in chronological order, a magnetic tape for recording thereon verbal descriptions of the events depicted on said paper tape, means for synchronizing said paper and magnetic tapes, means for exposing to view only a preselected portion of said paper tape, and means for automatically playing back that portion of said magnetic tape haivng recorded thereon the description of the event depicted on said preselected portion of said paper tape.

4. An educational apparatus for aiding the teaching of history comprising a scaled dated tape for representing thereon historical vignettes, voice recording means for recording verbal descriptions of said historical vignettes, means for identifying on said recording means the historical vignettes of which each recording is descriptive, and means for automatically exposing any preselected portion of said tape and for playing back the associated verbal description on said voice recording means.

5. A method of teaching history including the steps of
 (1) sequentially displaying for view successive portions of a calibrated tape having printed thereon historical dates in chronological sequence,
 (2) arranging a plurality of vignettes in chronological order,
 (3) affixing appropriate vignettes adjacent to the corresponding dates on said tape,
 (4) recording verbal descriptions of the vignettes being affixed on said tape, and (5) synchronizing the tape and verbal descriptions to each other.

References Cited in the file of this patent

UNITED STATES PATENTS

| | | |
|---|---|---|
| 2,087,043 | Phillips | July 13, 1937 |
| 2,783,454 | North | Feb. 26, 1957 |

FOREIGN PATENTS

| | | |
|---|---|---|
| 144,032 | Great Britain | June 10, 1920 |
| 502,195 | Great Britain | Mar. 14, 1939 |

OTHER REFERENCES

Skinner: "Professor Skinner's Teaching Machine, page 195, Fortune, November 1958.

Brochure, "Rheem Califone Language Laboratory," Rheem Califone Corporation, Hollywood 38, Calif., published March 1960.